United States Patent Office 3,501,449
Patented Mar. 17, 1970

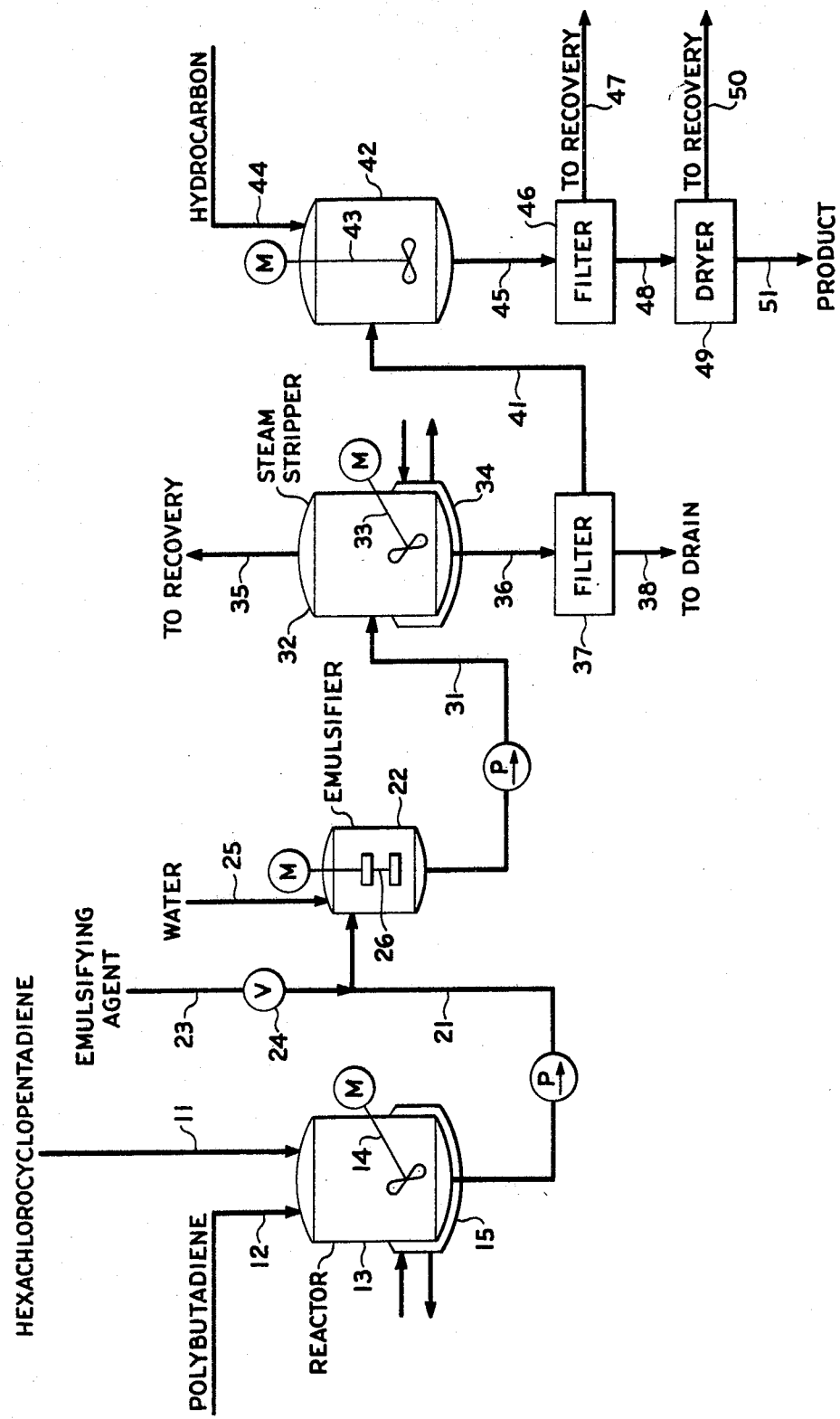

3,501,449
POLYMER RECOVERY AND PURIFICATION PROCESS
Donald H. Thorpe, Williamsville, and Gilbert Witschard, Grand Island, N.Y., assignors to Hooker Chemical Corporation, Niagara Falls, N.Y., a corporation of New York
Continuation of application Ser. No. 489,957, Sept. 24, 1965. This application Mar. 13, 1969, Ser. No. 809,473
Int. Cl. C08d 5/02
U.S. Cl. 260—94.7                                   15 Claims

ABSTRACT OF THE DISCLOSURE

Polymers of a butadiene polymer and polyhalogenated cyclopentadiene are recovered and purified by a process which comprises contacting a mixture comprised of a polyhalogenated cyclopentadiene and a solid polymer of a butadiene polymer and a polyhalogenated cyclopentadiene, with an acyclic hydrocarbon to remove unreacted polyhalogenated cyclopentadiene from the polymer, and separating the acyclic hydrocarbon and unreacted polyhalogenated cyclopentadiene from the solid polymer.

---

This invention relates to the recovery of polymers from solution. In another aspect, the invention relates to the purification of polymers to remove extraneous materials therefrom. More particularly, the invention relates to the recovery and purification of polymers formed by the reaction of a polyhalogenated cyclopentadiene with a butadiene polymer.

Highly useful halogen-containing polymeric materials are produced by reacting a polymer of butadiene with polyhalogenated cyclopentadienes having the formula:

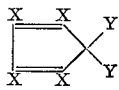

wherein X is selected from the group consisting of fluorine, chlorine and bromine, and Y is selected from the group consisting of fluorine, chlorine, bromine and an alkoxy radical. Generally, the alkoxy radicals have 1 or 2 carbon atoms, but higher carbon chain links, for example, up to 4 carbon atoms, can be employed. Typical polyhalogenated cyclopentadienes are hexachlorocyclopentadiene, hexabromocyclopentadiene, 1,1-dibromotetrachlorocyclopentadiene, 1,1-difluorotetrachlorocyclopentadiene, 1,1 - dimethoxytetrachlorocyclopentadiene, 1,1 - diethoxytetrachlorocyclopentadiene, and the like. Polymers of butadiene that can be reacted or adducted with the polyhalogenated cyclopentadienes are the various ethylenically unsaturated polybutadienes prepared by mass, solution or emulsion polymerization techniques, butadiene-styrene copolymers made by emulsion and solution methods, butadiene-styrene block copolymers, butadiene-acrylonitrile copolymers, and the like. Particularly useful are the polybutadienes which contain at least 30 percent of the cis-1,4 configuration, and preferably at least 80 percent of the cis-1,4 configuration, and still more preferably at least 90 percent of the cis-1,4 configuration.

In the process for adducting the halogenated cyclopentadiene to a butadiene polymer by the Diels-Alder reaction, it is preferred to utilize in the reaction mixture at least about 5 parts of polyhalogenated cyclopentadiene per part of butadiene polymer. However, lower ratios, such as 3 or 4 parts of halogenated cyclopentadiene can be used per part of butadiene polymer, but longer reaction times are then desirable. Much larger quantities of halogenated cyclopentadiene can be utilized, e.g., up to 100 parts of halogenated cyclopentadiene per part of butadiene polymer and higher. In fact, it is convenient to use the halogenated cyclopentadiene as the diluent in the reaction mixture. However, other diluents that are not deleterious to the reaction can be used, for example, the aromatic hydrocarbons such as benzene, toluene, xylene, and the like; chlorinated hydrocarbons such as trichloroethylene, tetrachloroethane, the chlorobenzenes, the chlorotoluenes, and the like; esters such as isobutyl acetate, ethyl butyrate, and the like. The ratio of solvent used in the reaction mixture generally does not exceed about 100 parts per part of butadiene polymer reacted. The reaction proceeds best at elevated temperatures, generally in the range of 70 to 200 degrees centigrade, preferably in the range of 100 to 170 degrees centigrade. It is generally convenient to conduct the reaction at atmospheric pressure, although, depending on the use of particular diluents and reaction temperatures, it is sometimes convenient to carry out the reaction at superatmospheric pressure or under vacuum. During the course of the reaction, some halogen halide may be produced. The color of the resulting product can be improved by absorbing the hydrogen halide by including a scavenger, such as an epihalohydrin or other epoxide, in the reaction zone. It is sometimes desirable to include other additives in the reaction mixture to control the molecular weight of the polymer product.

In most product applications, it is desirable to utilize the halogenated polymer of the invention in a form that is substantially free of unreacted halogenated cyclopentadiene. However, because of the relatively high boiling points of the halogenated cyclopentadienes, it is somewhat difficult to remove the unreacted polyhalogenated cyclopentadiene from the reaction product.

Accordingly, an object of the invention is to provide an improved process for the recovery of the adduct of a butadiene polymer and a polyhalogenated cyclopentadiene from the reaction mixture from which the polymer is produced. Another object of the invention is to provide a process for the production of an adduct of a butadiene polymer and a polyhalogenated cyclopentadiene that is substantially free of unreacted polyhalogenated cyclopentadiene. A further object of the invention is to provide a polyhalogenated polymer product that has a low, residual polyhalogenated cyclopentadiene content. These and other objects and advantages of the invention will be apparent to one skilled in the art upon reading the following detailed specification and the accompanying drawing.

In accordance with this invention, there is provided a process which comprises contacting an adduct of a butadiene polymer and a polyhalogenated cyclopentadiene which contains unreacted or free polyhalogenated cyclopentadiene, with an acyclic hydrocarbon to remove the unreacted polyhalogenated cyclopentadiene from the polymer, and thereafter separating the acyclic hydrocarbon and polyhalogenated cyclopentadiene from the polymer. The polymeric material containing the residual, unreacted polyhalogenated cyclopentadiene is generally in solid form, i.e., free-flowing particles, such as powder, granules, flakes, or other comminuted or particulate form. The solid polymeric material can be produced by several methods. In a preferred method, the product of the reaction of a butadiene polymer and a polyhalogenated cyclopentadiene is emulsified with water or other medium, and the resulting emulsion is heated to an elevated temperature to evaporate a portion of the unreacted polyhalogenated cyclopentadiene, and to form an aqueous slurry of solid polymer containing the remaining unreacted polyhalogenated cyclopentadiene. Thereafter, the aqueous slurry is separated into an aqueous phase and a solid polymer phase, and the resulting solid polymer phase is contacted with an acyclic hydrocarbon to remove the remaining unreacted polyhalogenated cyclopentadiene from the solid polymer. In other embodiments of the invention, the solid polymeric material can be obtained by subjecting the aforesaid aqueous emulsion to hot gases such as in a spray drier, to evaporate a portion of the unreacted polyhalogenated cyclopentadiene and to form solid polymer particles, which are thereafter contacted with an acyclic hydrocarbon to remove the residual, unreacted polyhalogenated cyclopentadiene therefrom. Other methods for obtaining the solid polymeric material for use in the process of the invention include precipitation of the polymer from the aforesaid aqueous emulsion, and direct precipitation of the polymer from the reaction mixture. In the foregoing methods, a distinct solid polymer phase is formed for use in subsequent treatment steps, i.e., the polymer is in the normally solid state at 30 degrees centigrade.

The invention will be further described by reference to the accompanying drawing which is a flow sheet for a preferred embodiment of the process of the invention.

A polyhalogenated cyclopentadiene, such as hexachlorocyclopentadiene, and a butadiene polymer such as polybutadiene, are introduced through conduits 11 and 12, respectively, into reactor 13. The reaction zone can comprise a single reactor operated either batchwise or continuously, or a group of reactors operated either batchwise or continuously in series and/or in parallel. Reactor 13 is provided with suitable agitation means such as agitator 14, and suitable heating means such as heating jacket 15. After a suitable reaction cycle in accordance with the disclosure given hereinbefore, the reaction mixture is tranferred through conduit 21 to emulsifier 22. A suitable emulsifying agent is transferred through conduit 23 and control valve 24 to the reaction mixture in conduit 21. Alternatively, the emulsifying agent can be injected directly into the emulsifier 22. Water is introduced to emulsifier 22 through conduit 25. The components are subjected to vigorous agitation by a suitable agitator 26 and the resulting emulsion is transferred through conduit 31 to steam stripper 32. The steam stripping zone preferably comprises an enclosed vessel equipped with suitable agitation means such as agitator 33 and suitable heating means such as heat jack 34. The steam stripping vessel can also be heated directly with open steam which can be introduced through suitable pressure nozzles (not shown). Vapors from the steam stripper 32 comprising unreacted hexachlorocyclopentadiene, water and other impurities, are taken overhead through conduit 35 to recovery facilities (not shown). The hexachlorocyclopentadiene can be readily separated from the water and other impurities and recycled to the reaction zone. The aqueous slurry of polymer particles produced in the steam stripper 32 is transferred through conduit 36 to filter 37 for separation of a solid polymer phase from the aqueous phase which is discharged from the filter through conduit 38. The solid polymer phase is transferred from the filter through conduit 41 to zone 42. The transfer of the solid polymer phase can be readily accomplished by suitable means such as a conveyor belt, an auger, or by gravity flow. Zone 42 can comprise an enclosed vessel equipped with suitable agitation means such as agitator 43. Zone 42 is supplied with a suitable amount of hydrocarbon extraction media through conduit 44, and the resulting hydrocarbon slurry of polymer particles is transferred through conduit 45 to filter 46. In the filtration zone, the bulk of the hydrocarbon together with the hexachlorocyclopentadiene extracted from the polymer particles is separated from a solid polymer phase and discharged through conduit 47 to suitable recovery facilities (not shown). The hydrocarbon and hexachlorocyclopentadiene can be readily separated, such as by distillation, for recycle to conduits 44 and 11, respectively. The solid polymer is discharged from filter 46 through conduit 48 to drier 49. Residual volatile matter, such as hydrocarbon, hexachlorocyclopentadiene, water, and other volatile compounds are discharged from the drier 49, through conduit 50. The dry polymer product is recovered from the drier through conduit 51.

In embodiments of the invention wherein the product of the reaction of the butadiene polymer and polyhalogenated cyclopentadiene is subjected to emulsification as a method for commencing the recovery of the polymer from the solution, the preferred emulsifying medium is water. However, other emulsifying media can be employed, such as the dihydric alcohols, for example, ethylene glycol, diethylene glycol, propylene glycol, dipropylene glycol, and other alkylene glycols. Also suitable as emulsifying media are trihydric alcohols, such as glycerol, and the like. Various proportions of emulsifying media can be employed, depending somewhat upon subsequent process operations. However, the ratio is generally in the range up to 5 parts of emulsifying media, such as water, per part of reaction mixture, such as polymer and unreacted polyhalogenated cyclopentadiene. The ratio is preferably in the range of 0.5 to 2 parts of emulsifying medium per part by weight of reaction mixture.

Various emulsifying agents can be employed, including the nonionic, anionic and cationic types, as well as mixtures thereof, such as mixtures of nonionic and anionic types. Suitable nonionic emulsifying agents include the alkylphenoxypoly (ethyleneoxy) ethanols and the dialkylphenoxypoly (ethyleneoxy) ethanols, preferably those wherein the alkyl substituent has 5 to 12 carbon atoms, and which have 1 to 20 ethyleneoxy groups. Typical members are octylphenoxypoly(ethyleneoxy) ethanol, nonylphenoxypoly (ethyleneoxy) ethanol and dodecylphenoxypoly (ethyleneoxy) ethanol. Also useful are the fatty acid esters of polyhydric alcohols or ether alcohols, for example, glycerol monostearate; esters of ethylene glycol, diethylene glycol, triethylene glycol and polyethylene glycol, for example, the condensation product of oleic acid with ethylene oxide; and fatty esters of sugar alcohols. Suitable anionic emulsifying agents include the alkali metal alkylbenzene sulfonates, particularly those wherein the alkali metal is sodium or potassium and the alkyl group has 8 to 20 carbon atoms. Typical members are sodium dodecylbenzene sulfonate and potassium dodecylbenzene sulfonate. Another suitable group of anionic emulsifying agents is the alkali metal alkyl sulfates, particularly those wherein the alkali metal is sodium or potassium and the alkyl group has 8 to 20 carbon atoms. A typical member is sodium lauryl sulfate. Also useful are the sulfonated aliphatic polyesters, free acids of complex phosphate esters, sodium salts of complex phosphate esters and sodium salt of disproportionated wood resin. Another suitable group of anionic emulsifying agents is the alkali metal lignin sulfonates, such as sodium lignin sulfonate and potassium lignin sulfonate. Suitable cationic emulsifying agents include the fatty amides of monoethanolamines; fatty nitriles and fatty acid amides, such as oleic morpholide. Also useful are cationic agents such as N-coco-β-amino buteric acid, dicoco dimethyl ammonium chloride and polyoxyethylated alkylamines. Particularly suited for use in the process of the invention are mixtures of an anionic agent and a nonionic agent, such as a mixture of a sodium alkylbenzene sulfonate and an alkylphenoxy(ethyleneoxy)ethanol. The emulsifying agents are employed in a ratio of about 1 to 5 parts by weight per 100 parts of the butadiene polymer-polyhalogenated cyclopentadiene reaction product. Preferably the ratio is in the range of 2 to 4 parts per 100 parts by weight.

Emulsification of the reaction product is generally conducted at a temperature up to about 150 degrees centigrade, preferably in the range of 25 to 140 degrees centigrade. Residence time in the emulsification zone can vary considerably depending on the type of equipment employed, but would generally be in the range of 0.1 to 10 minutes. Emulsification can be carried out in various mechanical devices which subject the components to vigorous agitation. A small vessel equipped with any efficient mixer, such as a paddle-type mixer, is suitable, or other more elaborate devices, such as a high speed turbine, which gives high shear agitation, can be used, in batch or continuous processes.

In the preferred embodiment of the invention, the emulsified reaction product is subjected to steam stripping to remove a portion of the unreacted polyhalogenated cyclopentadiene and to form the solid polymer suitable fo final purification. The emulsion is introduced to the stripping zone and maintained at a temperature in the range of 20 to 100 degrees centigrade, preferably 50 to 80 degrees centigrade. Operation under vacuum is usually desirable to prevent break-up of the emulsion and to facilitate the evaporation of the high boiling polyhalogenated cyclopentadiene. The steam stripping zone can be operated at a pressure of 1 to 30 pounds per square inch absolute, more usually at 1 to 15 pounds and preferably at 1 to 5 pounds per square inch absolute. Residence time in the steam stripping zone can vary considerably, but is generally in the range of 0.1 to 5 hours, preferably 0.1 to 2 hours for a continuous process. For a batch process, the stripping time can be up to 24 hours or longer. The stripping zone can comprise a single enclosed vessel such as depicted in the accompanying drawing or can comprise two or more enclosed vessels operated in series. The overhead vapors from the steam stripping zone are condensed, and the polyhalogenated cyclopentadiene is recovered from the condensate and purified, such as by distillation for return to the reaction zone. The aqueous slurry of solid polymer produced in the stripping zone is filtered or centrifuged for recovery of the solid polymer therefrom. Various types of batch or continuous filters and centrifuges that are commercially available can be employed.

In another embodiment of the invention the emulsified reaction product is contacted with hot gases to facilitate evaporation of the unreacted polyhalogenated cyclopentadiene, as well as the emulsifying medium, and to form the solid polymer suitable for treatment in final purification steps. The treatment with hot gases can be suitably accomplished in equipment such as spray driers, shot driers, and the like. The temperature is generally in the range of about 150 to 300 degrees centigrade, although higher and lower temperatures can be employed, depending upon the contact time with the hot gases. The contact time can vary considerably, but generally is in the range of from about 0.1 to 10 minutes, preferably 0.1 to 1 minute. Gases that can be employed are those that are nonreactive with the components of the emulsion. The off-gas from the contacting step is passed through a condenser to condense the volatile matter from which the polyhalogenated cyclopentadiene can be recovered for reuse in the process.

In another embodiment of the invention, the emulsified reaction product can be contacted with a nonsolvent, such as an alcohol, to precipitate the polymer. Preferred are the aliphatic alcohols of 1 to 10 carbon atoms, such as methyl alcohol, ethyl alcohol, propyl alcohol, amyl alcohol, decyl alcohol, and the like. The ratio of alcohol to emulsion is generally in the range of 5 parts by volume of alcohol per part by volume of emulsion. The precipitation temperature is generally in the range of about 25 to 50 degrees centigrade. The precipitated polymer is readily recovered in a suitable filter or centrifuge as described hereinbefore.

In a further embodiment of the invention, the solid polymer can be directly recovered from the butadiene polymer-polyhalogenated cyclopentadiene reaction product by treating the reaction product with a nonsolvent, such as an alcohol, to precipitate the polymer. Preferred are the aliphatic alcohols of 1 to 10 carbon atoms, such as methyl alcohol, ethyl alcohol, propyl alcohol, amyl alcohol, decyl alcohol, and the like. The precipitation temperature is generally in the range of from about 25 to 50 degrees centigrade, and the precipitated polymer can be suitably recovered in a filter or centrifuge as described hereinbefore.

The solid, polyhalogenated polymer is contacted with an acrylic hydrocarbon, generally of 3 to 12 carbon atoms, preferably of 5 to 12 carbon atoms, and which generally has a boiling point of up to about 200 degrees centigrade, but which preferably boils in the range of 25 to 150 degrees centigrade. Typical hydrocarbons include propane, isobutylene, butane, n-pentane, isopentane, hexane, heptane, octane, 2-ethylhexane, isooctane, diisobutylene, nonane, decane, decene, undecane, as well as various hydrocarbon fractions including petroleum ether and naphthas. The suitable hydrocarbons do not appreciably swell or dissolve the polyhalogenated polymer. The proportion of hydrocarbon employed depends somewhat on the contacting equipment and other variables used in the process. However the hydrocarbon is generally employed in the ratio of about 2 to 20 parts by weight of hydrocarbon per part by weight of polyhalogenated polymer, preferably in the range of 5 to 12 parts hydrocarbon per part of polymer. Various contacting times and temperatures can be employed, but these will generally be in the range of 0 to 60 degrees centigrade, preferably 5 to 50 degrees centigrade, and 0.1 to 5 hours. The hydrocarbon contacting step can be accomplished in batch-operated or continuously-operated equipment of various types. Thus, the contacting process can be carried out in a single enclosed vessel in which the solid polymer containing residual polyhalogenated cyclopentadiene is introduced into a volume of hydrocarbon and vigorously agitated. Thereafter, the polymer is permitted to settle to the bottom of the vessel and the supernatant liquid is decanted off to a suitable recovery process for separation of the hydrocarbon and unreacted polyhalogenated cyclopentadiene. Subsequently, additional hydrocarbon can be introduced to the vessel to re-slurry the solid polymer particles to facilitate additional removal of polyhalogenated cyclopentadiene therefrom. This sequence of contacting steps can be repeated as often as desired. Alternatively, the treatment can be carried out in a series of enclosed vessels wherein the effluent from one vessel is phase separated, such as in a centrifuge, to recover the bulk of the hydrocarbon and the solid polymer is transferred to the next treating vessel in the series. The contacting step with hydrocarbon can also be carried out in apparatus in which the solid polymer is held substantially stationary and the treating liquid is circulated through the bed of solid polymer. The contacting step can also be carried out in a countercurrent contacting process wherein the solid polymer is passed countercurrent to the moving stream of hydrocarbon. Thus, it is apparent that there are many methods for accomplishing the process of contacting the polyhalogenated polymer for removal of the residual, unreacted polyhalogenated cyclopentadiene therefrom.

Following the extraction process, the solid, purified polymer can be recovered from the hydrocarbon extraction medium in a suitable separation zone comprised of batch-operated or continuously-operated filters or centrifuges, and the like. Thereafter, the solid polymer is dried in a suitable batch-operated on continuously operated drier, such as a rotary drier, tray drier, and the like. In the drying process, the solid polymer is generally contacted with a hot gas which is nonreactive with the polymer product, and which is at a temperature up to about 150 degrees centigrade. The liquid and vapor effluent from the final recovery steps in the process are passed to suitable recovery processes for the separation of the polyhalogenated cyclopentadiene from the hydrocarbon treating agent to facilitate recycle of the components to the reaction and purification zones, respectively.

The solid polymer product of the process of the invention generally contains less than about one weight percent of the high boiling, unreacted polyhalogenated cyclopentadiene, preferably less than about 0.5 weight percent. The following tabulation shows the effect of free or unreacted hexachlorocyclopentadiene on the melting range of the polyhalogenated polymer product.

Free hexachlorocyclopentadiene

| Weight percent | Melting range degrees centigrade |
|---|---|
| 14.3 | 125–131 |
| 4.9 | 169–181 |
| 1.4 | 180–188 |
| 0.2 | 185–197 |

The foregoing data were obtained with a hexachlorocyclopentadiene-polybutadiene product containing 58.9 weight percent chlorine and having an intrinsic viscosity of 0.324 measured in toluene. The melting range was observed by placing the polymer between cover glasses on a Fisher-Johns hot stage.

The invention is further described in the following specific examples which are intended to further illustrate the invention but not to limit it. In these examples, the temperatures are given in degrees centigrade, and parts are by weight unless specified otherwise.

EXAMPLE 1

Twelve parts of a polybutadiene rubber having at least 95 percent cis-1,4 content were reacted with 145 parts of hexachlorocyclopentadiene at 150 degrees centigrade for 5 hours. The reaction product comprised about 32.5 percent by weight of polyhalogenated polymer and 67.5 percent of unreacted hexachlorocyclopentadiene. The reaction product was emulsified with 119 parts of water and 7 parts of octylphenoxypoly(ethyleneoxy)ethanol containing about 10 ethyleneoxy groups per molecule. Thereafter, 145 parts of the emulsion were sprayed through a pressure nozzle into an enclosed, heated steam stripping vessel. The temperature was maintained at 60 degrees centigrade and the pressure at 2.9 pounds per square inch absolute. An aqueous slurry of polymer particles was removed from the steam stripping vessel and filtered to recover the solid polymer particles from the slurry. The solid polymer was discharged into an enclosed, agitated vessel containing normal hexane. After mixing for one half hour, the polymer particles were permitted to settle and the solvent phase was removed by decantation. The slurry remaining in the enclosed vessel was then extracted three times using fresh normal hexane for each wash. The mixing time was 0.5 hour for each wash. The resulting slurry was then filtered and the polymer was dried in a rotary drier under vacuum. The dried polymer contained 0.2 weight percent unreacted hexachlorocyclopentadiene.

EXAMPLE 2

100 parts of an adduct of hexachlorocyclopentadiene and cis-polybutadiene such as prepared in Example 1 and containing 0.54 weight percent unreacted hexachlorocyclopentadiene was slurried with 500 parts of petroleum ether and agitated for 3 hours. The polymer was filtered from the petroleum ether. At the end of the process, the polymer had a residual hexachlorocyclopentadiene content of 0.27 weight percent.

EXAMPLE 3

66 parts of halogenated polymer such as prepared in Example 1, but containing 4.4 weight percent unreacted hexachlorocyclopentadiene were placed in a Soxhlet extractor and extracted 30 times with normal pentane. The extracted polymer contained 0.02 weight percent unreacted hexachlorocyclopentadiene.

EXAMPLE 4

Twenty parts of hexachlorocyclopentadiene-cis-polybutadiene prepared as described in Example 1, but containing 11 weight percent unreacted hexachlorocyclopentadiene were placed in a Soxhlet extractor and extracted 67 times with pentane. The resulting extracted polymer contained less than 0.04 weight percent unreacted hexachlorocyclopentadiene.

EXAMPLE 5

Portions of hexachlorocyclopentadiene-cis-polybutadiene reaction product containing 28, 27 and 15.5 weight percent unreacted hexachlorocyclopentadiene, respectively, were extracted continuously for a period ranging from 3 to 6 hours with cold hexane. The resulting extracted polymer contained 0.4 weight percent unreacted hexachlorocyclopentadiene.

While the invention has been described with reference to certain specific embodiments, it will be recognized by those skilled in the art that many variations are possible without departing from the spirit and scope of the invention.

What is claimed is:

1. A process for obtaining a polymer product containing less than about one percent of unreacted polyhalogenated cyclopentadiene of the formula:

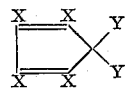

where X is selected from the group consisting of fluorine, chlorine and bromine and Y is selected from the group consisting of fluorine, chlorine, bromine and alkoxy, which consists essentially of contacting a mixture comprised of a solid polymer adduct of the polyhalogenated cyclopentadiene and a polybutadiene having at least 80 percent of cis-1,4 configuration and unreacted polyhalogenated cyclopentadiene, with about 2 to 20 parts by weight per part of polyhalogenated polymer of an acyclic hydrocarbon having 3 to 12 carbon atoms and boiling at a temperature of 25 to about 200 degrees centigrade to remove unreacted polyhalogenated cyclopentadiene from the polymer, and separating the acyclic hydrocarbon and unreacted polyhalogenated cyclopentadiene from the solid polymer.

2. A process in accordance with claim 1 for obtaining a polymer product containing less than about one percent of unreacted hexachlorocyclopentadiene which consists essentially of contacting a solid polymer of polybutadiene having at least 80 percent of cis-1,4 configuration and hexachlorocyclopentadiene which contains unreacted hexachlorocyclopentadiene with about 2 to 20 parts by weight per part of polyhalogenated polymer of an acyclic hydrocarbon containing 3 to 12 carbon atoms and boiling at a temperature of 25 to about 200 degrees centigrade to separate said unreacted hexachlorocyclopentadiene from the polymer, and separating the acyclic hydrocarbon and unreacted hexachlorocyclopentadiene from the polymer.

3. The process of claim 2 wherein the acyclic hydrocarbon is hexane.

4. The process of claim 2 wherein the acyclic hydrocarbon is pentane.

5. The process of claim 2 wherein the acyclic hydrocarbon is petroleum ether.

6. A process in accordance with claim 1 for obtaining a polymer product containing less than about one percent of unreacted polyhalogenated cyclopentadiene which consists essentially of (1) contacting a mixture of a solid polymer adduct of the polyhalogenated cyclopentadiene and a polybutadiene having at least 80 percent of cis-1,4-configuration and unreacted polyhalogenated cyclopentadiene with about 2 to 20 parts by weight per part of polyhalogenated polymer of an acyclic hydrocarbon containing 3 to 12 carbon atoms and boiling at a temperature of 25 to about 200 degrees centigrade to remove unreacted polyhalogenated cyclopentadiene from the polymer, (2) separating the acyclic hydrocarbon and unrecated polyhalogenated cyclopentadiene from the solid polymer, (3) contacting the separated polymer with additional acyclic hydrocarbon to remove residual, unreacted polyhalogenated cyclopentadiene from the polymer, and (4) separating the acyclic hydrocarbon and unreacted polyhalogenated cyclopentadiene from the solid polymer.

7. A process in accordance with claim 1 for obtaining a polymer product containing less than about one percent of unreacted polyhalogenated cyclopentadiene which consists essentially of (1) heating an emulsion comprised of (a) the polymer adduct of a polybutadiene having at least 80 percent of cis-1,4 configuration and the polyhalogenated cyclopentadiene, (b) unreacted polyhalogenated cyclopentadiene, (c) an emulsifying medium, and (d) an emulsifying agent, to an elevated temperature sufficient to evaporate a portion of the unreacted polyhalogenated cyclopentadiene and to provide a solid polymer containing residual, unreacted polyhalogenated cyclopentadiene, (2) contacting the polymer with about 2 to 20 parts by weight per part of polyhalogenated polymer of an acyclic hydrocarbon containing 3 to 12 carbon atoms and boiling at a temperature of 25 to about 200 degrees centigrade to remove unreacted polyhalogenated cyclopentadiene therefrom, and (3) separating the acyclic hydrocarbon and the unreacted polyhalogenated cyclopentadiene from the polymer.

8. A process in accordance with claim 1 for obtaining a polymer product containing less than about one percent of unreacted polyhalogenated cyclopentadiene which consists essentially of (1) heating an emulsion comprised of (a) the polymer adduct of a polybutadiene having at least 80 percent of cis-1,4 configuration and the polyhalogenated cyclopentadiene, (b) unreacted polyhalogenated cyclopentadiene, (c) an emulsifying medium, and (d) an emulsifying agent, to an elevated temperature sufficient to evaporate a portion of the unreacted polyhalogenated cyclopentadiene and to form a slurry of solid polymer containing residual, unreacted polyhalogenated cyclopentadiene, (2) separating said slurry into a liquid phase and a solid polymer phase, (3) contacting said polymer with about 2 to 20 parts by weight per part of polyhalogenated polymer of an acyclic hydrocarbon containing 3 to 12 carbon atoms and boiling at a temperature of 25 to about 200 degrees centigrade to remove unreacted polyhalogenated cyclopentadiene therefrom, and (4) separating the acyclic hydrocarbon and the unreacted polyhalogenated cyclopentadiene from the polymer.

9. A process in accordance with claim 1 for obtaining a polymer product containing less than about one percent of unreacted hexachlorocyclopentadiene which consists essentially of (1) heating an emulsion comprised of (a) a polymer adduct of polybutadiene containing at least 80 percent of cis-1,4 configuration and hexachlorocyclocyclopentadiene, (b) unreacted hexachlorocyclopentadiene, (c) water, and (d) an emulsifying agent, to an elevated temperature sufficient to evaporate the major proportion of hexachlorocyclopentadiene and to form an aqueous slurry of solid polymer containing the minor proportion of unreacted hexachlorocyclopentadiene, (2) separating said aqueous slurry into an aqueous phase and a solid polymer phase, (3) contacting said solid polymer phase with about 2 to 20 parts by weight per part of polyhalogenated polymer of an acyclic hydrocarbon of 5 to 12 carbon atoms and boiling at a temperature of 25 to 150 degrees centigrade to remove unreacted hexachlorocyclopentadiene therefrom, and (4) separating the acyclic hydrocarbon and unreacted hexachlorocyclopentadiene from the polymer.

10. The process of claim 9 wherein the acyclic hydrocarbon is hexane.

11. The process of claim 9 wherein the acyclic hydrocarbon is pentane.

12. The process of claim 9 wherein the acyclic hydrocarbon is petroleum ether.

13. A process in accordance with claim 1 for obtaining a polymer product containing less than about one percent of unreacted polyhalogenated cyclopentadiene which consists essentially of (1) emulsifying the product of the reaction of a polymer of polybutadiene having at least 80 percent of cis-1,4 configuration and the polyhalogenated cyclopentadiene with an emulsifying medium and with an emulsifying agent or mechanical agitation, (2) heating the resulting emulsion to an elevated temperature sufficient to evaporate a portion of the unreacted polyhalogenated cyclopentadiene and to form a slurry of solid polymer containing residual, unreacted polyhalogenated cyclopentadiene, (3) separating said slurry into a liquid phase and a solid polymer phase, (4) contacting said solid polymer phase with about 2 to 20 parts by weight per part of polyhalogenated polymer of an acyclic hydrocarbon of 3 to 12 carbon atoms and boiling at a temperature of 25 to about 200 degrees centigrade to remove unreacted polyhalogenated cyclopentadiene therefrom, and (5) separating the acyclic hydrocarbon and unreacted polyhalogenated cyclopentadiene from the polymer.

14. A process in accordance with claim 1 for obtaining a polymer product containing less than about one percent of unreacted polyhalogenated cyclopentadiene which consists essentially of (1) reacting a polymer of polybutadiene containing at least 80 percent of cis-1,4 configuration with at least about three parts by weight of the polyhalogenated cyclopentadiene per part of butadiene polymer, (2) emulsifying the resulting reaction mixture with an emulsifying medium and with an emulsifying agent or mechanical agitation, (3) heating the resulting emulsion to an elevated temperature sufficient to evaporate a portion of the unreacted polyhalogenated cyclopentadiene and to form a slurry of solid polymer containing residual, unreacted polyhalogenated cyclopentadiene, (4) separating said slurry into an aqueous phase and a solid polymer phase, (5) contacting said solid polymer phase with about 2 to 20 parts by weight per part of polyhalogenated polymer of an acyclic hydrocarbon having 3 to 12 carbon atoms and which boils at a temperature in the range of 25 to about 200 degrees centigrade to remove the unreacted polyhalogenated cyclopentadiene therefrom, and (6) separating the acyclic hydrocarbon and unreacted polyhalogenated cyclopentadiene from the polymer.

15. A process in accordance with claim 1 which consists essentially of (1) reacting a polybutadiene having at least 80 percent of cis-1,4 configuration with at least five parts by weight of hexachlorocyclopentadiene per part of polybutadiene, (2) emulsifying the resulting reaction product with water and with an emulsifying agent or mechanical agitation, (3) heating the resulting emulsion to an elevated temperature sufficient to evaporate the major proportion of the unreacted hexachlorocyclopentadiene and to form an aqueous slurry of solid polymer containing a minor proportion of the unreacted hexachlorocyclopentadiene, (4) separating said aqueous slurry into an aqueous phase with about 2 to 20 parts by weight per part of polyhalogenated polymer of an acyclic hydrocarbon containing 5 to 12 carbon atoms and which boils at a temperature in the range of 25 to 150 degrees centigrade to remove unreacted hexachlorocyclopentadiene therefrom, and (6) recovering a polymer product containing less than about one weight percent of unreacted hexachlorocyclopentadiene.

References Cited

UNITED STATES PATENTS

| 2,917,495 | 3/1957 | Cobb et al. |
| 2,952,711 | 9/1960 | Roberts. |
| 3,098,058 | 7/1963 | Schweiker et al. |
| 3,219,647 | 11/1965 | Dietz. |
| 3,225,022 | 12/1965 | Andersen et al. |
| 3,268,475 | 8/1966 | Hock et al. |
| 3,325,464 | 6/1967 | Weil. |

JOSEPH L. SCHOFER, Primary Examiner

W. F. HAMROCK, Assistant Examiner

U.S. Cl. X.R.

260—96, 648, 890